(12) United States Patent
Trost et al.

(10) Patent No.: US 8,499,947 B2
(45) Date of Patent: Aug. 6, 2013

(54) INSULATING CONTAINER

(76) Inventors: Steven M. Trost, Stillwater, OK (US);
Joseph W. Pruitt, Stillwater, OK (US)

( * ) Notice: Subject to any disclaimer, the term of this patent is extended or adjusted under 35 U.S.C. 154(b) by 1387 days.

(21) Appl. No.: 12/084,180

(22) PCT Filed: Feb. 28, 2006

(86) PCT No.: PCT/US2006/007135
§ 371 (c)(1),
(2), (4) Date: Apr. 25, 2008

(87) PCT Pub. No.: WO2007/053173
PCT Pub. Date: May 10, 2007

(65) Prior Publication Data
US 2009/0130275 A1  May 21, 2009

Related U.S. Application Data

(60) Provisional application No. 60/596,995, filed on Nov. 3, 2005.

(51) Int. Cl.
*B65D 23/08* (2006.01)
*B65D 25/36* (2006.01)
(52) U.S. Cl.
USPC .................. 215/12.2; 215/12.1; 220/62.18

(58) Field of Classification Search
USPC ................. 215/12.2, 13.1, 12.1; 220/592.27, 220/62.18
See application file for complete search history.

(56) References Cited

U.S. PATENT DOCUMENTS

| | | | |
|---|---|---|---|
| 3,250,416 A | 5/1966 | Clarke | |
| 3,756,040 A | 9/1973 | Westling | |
| 3,940,001 A | 2/1976 | Haefner | |
| 3,946,892 A | 3/1976 | Rigal | |
| 4,610,366 A * | 9/1986 | Estes et al. | 426/106 |
| 5,551,592 A | 9/1996 | Barton | |
| 5,713,512 A | 2/1998 | Barrett | |
| 5,769,311 A | 6/1998 | Morita | |
| 6,575,321 B2 | 6/2003 | Bourque | |
| 6,594,927 B2 | 7/2003 | Witkowski | |
| 6,668,579 B1 | 12/2003 | Bigwood | |
| 6,730,253 B2 | 5/2004 | Etesse | |

FOREIGN PATENT DOCUMENTS

| | | | |
|---|---|---|---|
| EP | 0963727 A3 | 4/2002 |
| EP | 0963727 A3 | 4/2002 |

\* cited by examiner

*Primary Examiner* — Mickey Yu
*Assistant Examiner* — Niki Eloshway

(57) ABSTRACT

The current invention relates to a thermal-insulating container (100) comprising a vessel (105) and a wrap (125) wherein the vessel comprises one or more protrusions (108) extending from a sidewall (115) wherein the wrap and the protrusions cooperate to form one or more void spaces (120) between the wrap and the sidewall.

13 Claims, 13 Drawing Sheets

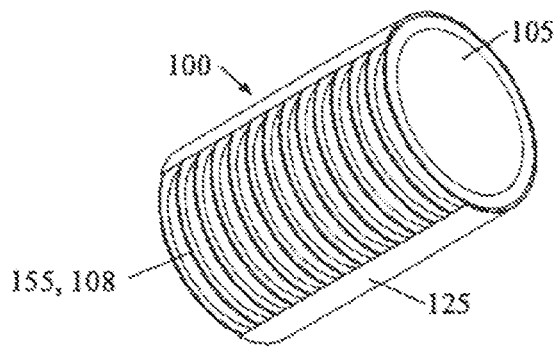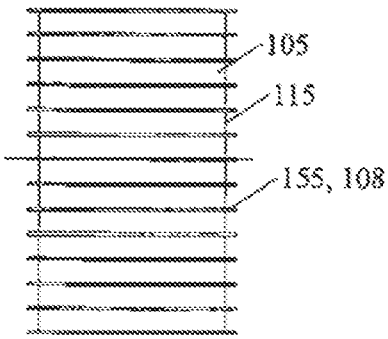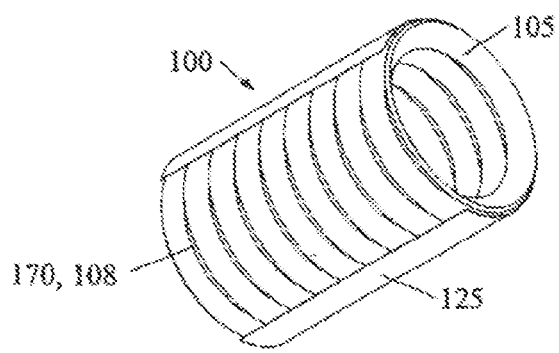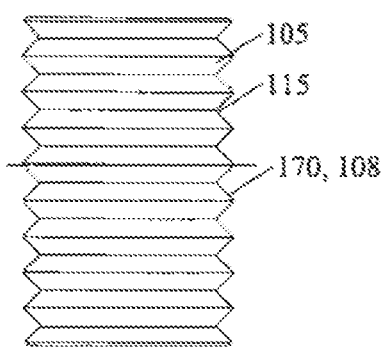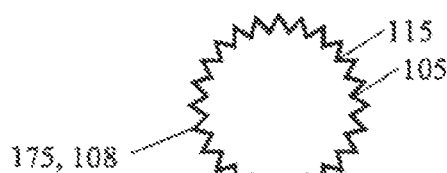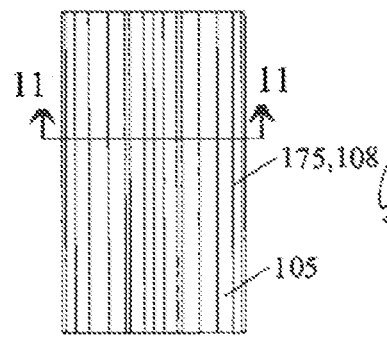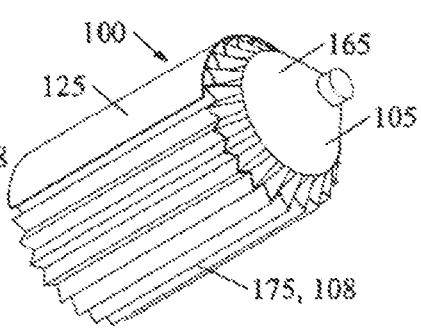

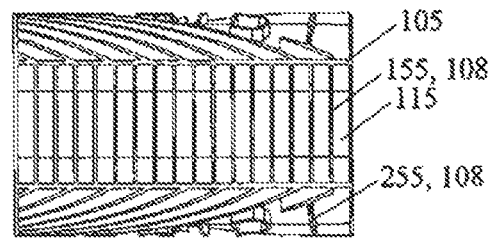
FIG. 51
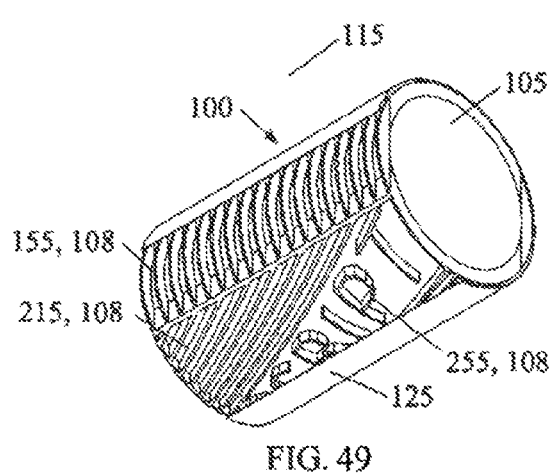
FIG. 49
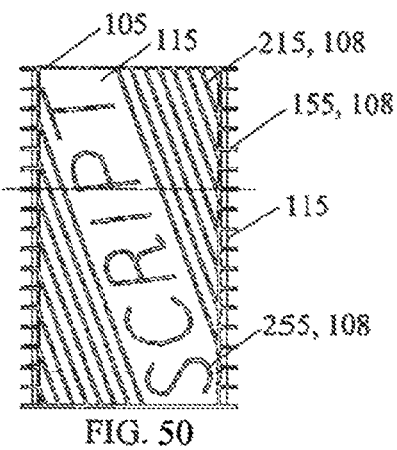
FIG. 50
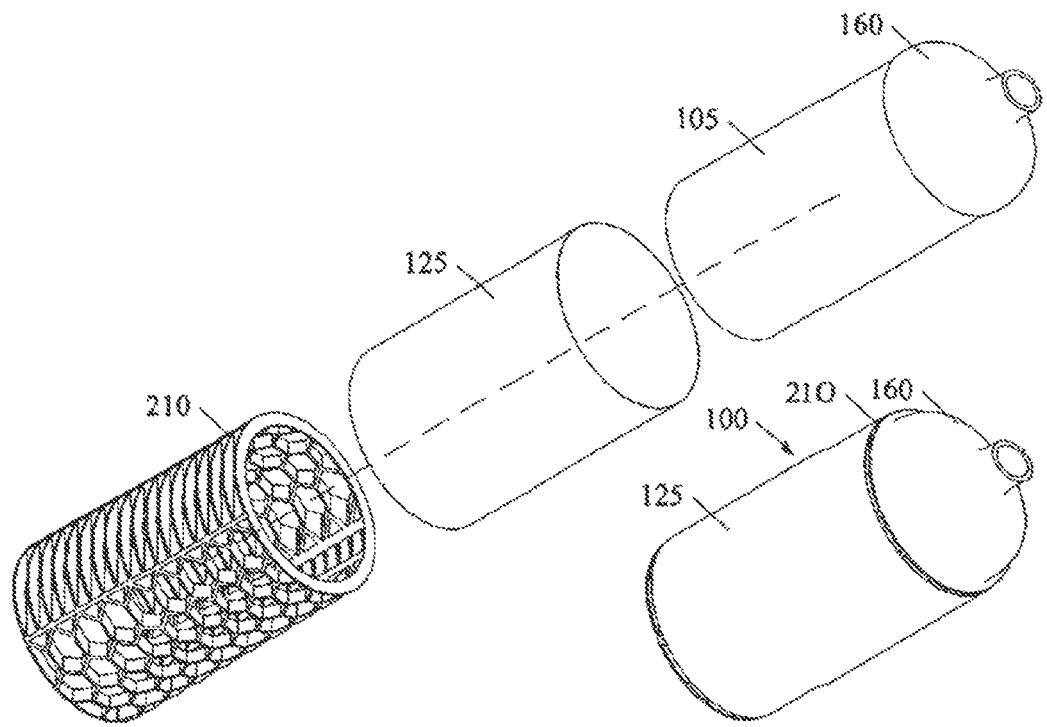
FIG. 52
FIG. 53

INSULATING CONTAINER

CROSS-REFERENCE TO RELATED APPLICATIONS

The present application claims priority to PCT Application No. PCT/US/2006/007135 entitled INSULATING CONTAINER, which claims priority to U.S. Provisional Patent Application Ser. No. 60/596,995 entitled METHOD AND DEVICE FOR INSULATING, filed on Nov. 3, 2005.

BACKGROUND OF THE INVENTION

A need currently exists for a thermal insulating container capable of providing significant thermal insulating capabilities while being only slightly more costly than containers having similar constructs, but not being insulated. In particular, a need exists for a means to manufacture a thermal insulating container wherein no additional manufacturing steps and no additional raw materials sources are required beyond those necessary to produce a similar, but non-insulating, container.

A need exists for a thermal insulating container that enables companies to establish distinctiveness, create brand-recognition potential, and make stylistic impressions on would-be consumers by virtue of the container's insulating means.

A need exists for a method to reduce the cool-down time for beverage bottles that are filled using hot-fill bottling techniques.

A need exists for a means to heat-shrink product labels onto filled beverage bottles using a hot-air tunnel in lieu of a steam tunnel.

The invention disclosed herein meets these needs.

SUMMARY OF THE INVENTION

In a preferred embodiment the current invention provides an insulated container. This container comprises a vessel having an inner and outer surface wherein said inner surface defines a void for receiving a material to be insulated. The outer surface of the vessel preferably carries at least one integral protrusion extending outwardly therefrom. Additionally, an insulating barrier is wrapped around the vessel cooperating with the protrusion to define at least one void space between the barrier and the outer surface of the vessel.

In another preferred embodiment, the current invention provides an insulated container. In this embodiment the container comprises a vessel having a bottom wall and a side wall wherein the side wall extends longitudinally from the bottom wall. The side wall has an upper end carrying an outwardly extending lip. The bottom wall also carries an outwardly extending lip. The side wall and bottom wall have interior and exterior surfaces with the interior surfaces defining the interior of the container. Preferably, the outer surface of the side wall carries at least one integral outwardly extending protrusion. The container further comprises a wrap secured around the vessel. The wrap cooperates with the first and second lips carried by the bottom wall and the side wall thereby defining at least one non-hermetic void space between the exterior of the side wall and the wrap. If the side wall carries an integral outwardly extending protrusion, the protrusion also cooperates with the wrapped to form at least one void space.

Still further, the current invention provides an insulated container comprising a vessel having a bottom, a side wall and a top. The top can take any of several configurations including the traditional flat top or a contoured top such as a funnel-shaped top. In this embodiment, the bottom carries a first lip extending beyond the outer diameter of the side wall. Additionally, a second lip is carried by the top wherein said lip also extends beyond the outer diameter of the side wall. Additionally, the exterior surface of the side wall carries at least one outwardly extending protrusion. Finally, a wrap is secured or placed around the vessel in cooperation with the protrusion and said first and second lips to define at least one non-hermetic void space between the exterior surface of the side wall and the wrap.

As an alternate embodiment, the current invention provides an insulated container wherein the lips carried by the side wall or the top of the container and the lip carried by the bottom are omitted while the side wall carries at least one integral protrusion extending from the exterior surface thereof. In this embodiment, a wrap positioned around the vessel cooperates with the integral protrusion thereby defining at least one non-hermetic void space between the exterior surface of the side wall and the wrap.

Still further, the current invention provides an insulated container in the shape of a bowl. In this embodiment, the invention comprises an inner bowl having an opening for receiving a substance to be insulated and a lid-sized to seal the opening in the inner bowl. Additionally, the inner bowl carries on its exterior surface a plurality of protrusions. Preferably, these protrusions are in the form of radial ridges extending from the bottom center to the upper opening. An outer bowl sized to receive the inner bowl is placed over the protrusions thereby forming at least one non-hermetic void space between the exterior surface of the inner bowl and the outer bowl. In the preferred embodiment the lid also carries at least one outwardly extending protrusion on the exterior surface of the lid. A wrap or flat cover is applied to the exterior surface in cooperation with the protrusion thereby forming at least one non-hermetic void space on the exterior of the lid.

Additionally, the current invention provides a method for manufacturing a thermal insulating container. According to this method a mold is fashioned suitable for forming a vessel. The mold further comprises at least one relief area suitable for actualizing a protrusion to be carried by the exterior of the vessel. After forming the mold, it is used in the conventional manner to produce a vessel according to techniques known to those skilled in the art. Thereafter the vessel is removed from the mold and a wrap placed around the vessel wherein the wrap cooperates with the protrusions to create one or more void spaces.

Still further, the current invention provides a method for hot filling a beverage into a thermal insulating bottle. According to this method, a beverage is heated to a desired temperature and placed within the bottle. The bottle preferably has one or more protrusions extending outwardly from the exterior surface thereof. In this instance, the protrusions enhance dissipation of heat from the bottle. Thereafter, the bottle and beverage are allowed to cool and a wrap is subsequently placed around the bottle. The wrap cooperates with the protrusions to form one or more void spaces between the wrap and the exterior of the side wall of the bottle.

Finally, the current invention provides a method for applying a heat shrinkable label to a beverage bottle. According to this method a beverage is placed within a bottle having one or more protrusions extending from the exterior surface thereof. Thereafter, a heat shrinkable label is placed around the bottle and dry heat used to shrink the label into general conformity with the bottle.

BRIEF DESCRIPTION OF THE DRAWINGS

FIG. 5 is a side isometric view of one embodiment of the current invention.

FIG. 6 is a front elevation view of the embodiment shown in FIG. 5.

FIG. 7 is a side isometric view of one embodiment of the current invention.

FIG. 8 is a front elevation view of the embodiment shown in FIG. 7.

FIG. 9 is a front elevation view of one embodiment of the current invention.

FIG. 10 is a side isometric view of one embodiment of the current invention.

FIG. 11 is a section view of the embodiment shown in FIG. 9.

FIG. 49 is a side isometric view of one embodiment of the current invention.

FIG. 50 is a front elevation view of the embodiment shown in FIG. 49.

FIG. 51 is a side view of the embodiment shown in FIG. 49.

FIG. 52 is a side isometric exploded view of one embodiment of the current invention.

FIG. 53 is a side isometric assembled view of the embodiment shown in FIG. 52.

DETAILED DESCRIPTION OF THE INVENTION

Figure 1:
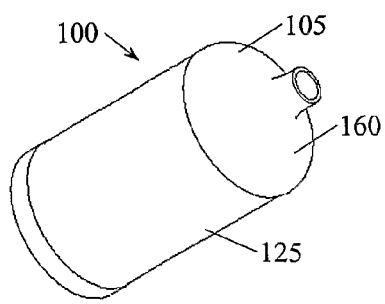
FIG. 1 is a side isometric assembled view of one embodiment of the current invention.
Figure 2:
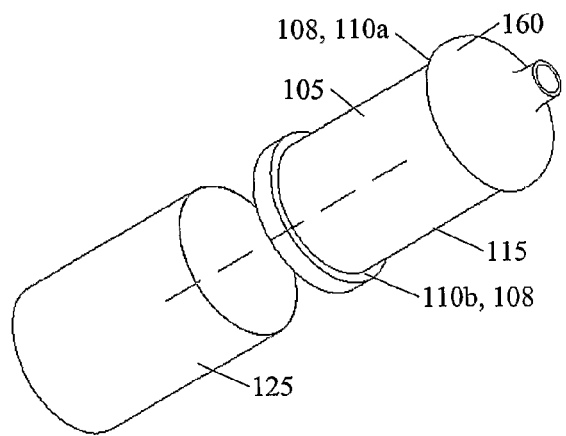
FIG. 2 is a side isometric exploded view of the embodiment shown in FIG. 1.
Figures 3, 3A, 3B:
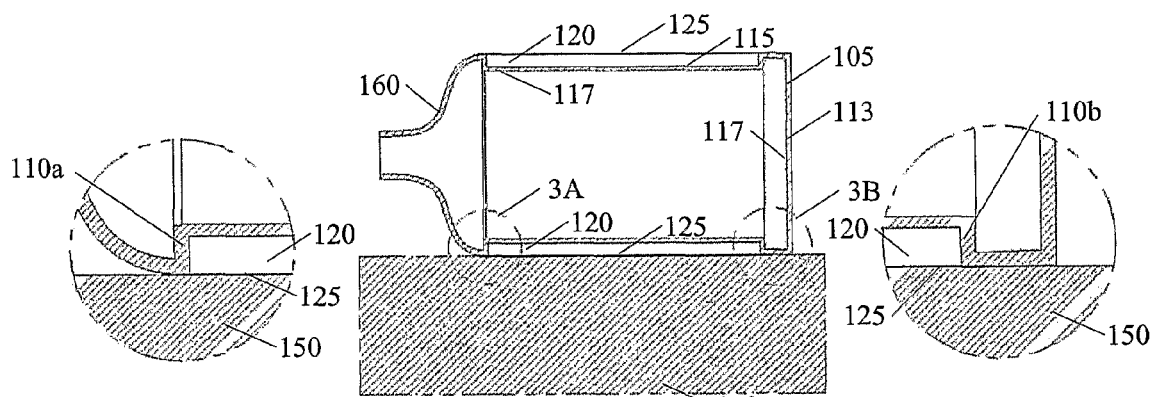
FIG. 3 is a side sectional view of the embodiment shown in FIG. 1.
FIG. 3A is an enlarged detail view from FIG. 3.
FIG. 3B is an enlarged detail view from FIG. 3.

FIGS. 1-3, depict one preferred embodiment of the current invention. As shown therein the present invention provides a thermal insulating container 100. Container 100 comprises a storage vessel 105. Vessel 105 has a sidewall 115 carrying upper and lower lips 110a and 110b respectively. A thin wrap 125 is positioned around vessel 105 to act as an insulating barrier. Wrap 125 cooperates with protrusions 108 to form an air pocket, referred to herein as a void space 120, between sidewall 115 and the external environment. In this embodiment, said protrusions 108 take the form of lips 110a,b; however, as will be discussed herein protrusions 108 may take various embodiments. Preferably, protrusions 108 are integrally formed with vessel 105; however, the current invention contemplates the addition of the protrusions following formation of vessel 105. In the instance of lips 110a,b, other embodiments include, but are not limited to flanges and ridges (not shown). Void space 120 has a depth selected to minimize convection currents within the air between sidewall 115 and wrap 125. Preferably, void space 120 has a depth of about 2 mm to about 12 mm. Void spaces 120 of this depth produce satisfactory insulating properties. More preferably, void space 120 has a depth of about 5 mm to about 7 mm.

Vessel 105 can be manufactured from numerous types of materials, with a preferred material being polyethylene terephthalate (PET) plastic. While numerous techniques may be used to form vessel 105, the preferred technique is extrusion blow molding. Vessel 105 has an inner surface 117 defined by bottom wall 113 and the interior of sidewall 115. Inner surface 117 defines a void or receiving area for holding a material such as food, beverage or medicine to be insulated. Bottom wall 113 and sidewall 115 may be formed separately and joined together to form vessel 105 or more preferably formed integrally during formation of vessel 105.

A non-limiting list of compounds suitable for use in manufacturing vessel 105 includes other plastic formulations, such as high density polyethylene (HDPE), low density polyethylene (LDPE), polypropylene (PP), polystyrene (PS), polyvinyl chloride (PVC), polycarbonate, and acrylonitrile butadiene styrene (ABS). Additionally, vessel 105 may be prepared from materials such as glass, metal, fiberglass, and wood.

Other suitable techniques for manufacturing vessel 105 include, but are not limited to, injection blow molding, stretch blow molding, injection molding, thermoforming, vacuum forming, pressure forming, rotational molding, twin sheet forming, stereo lithography, glass blowing, carving, metal casting, and liquid resin casting.

Wrap 125 is preferably manufactured from oriented polypropylene (OPP). However, other materials will perform equally well in the current invention. For example, a non-limiting list of suitable materials would include polypropylene (PP), polystyrene (PS), polyethylene (PE), polyvinyl chloride (PVC), glycolized polyester (PETG), polyester film (PETF), polyolefin, Tyvek®, paper, wood, rubber or rubber-like materials and cardboard.

A significant advantage of the current invention is the use of an extremely thin wrap 125. Preferably, wrap 125 has a thickness of about 0.015 inches (0.4 mm) or even about 0.005 inches (0.1 mm) or less. Although very thin, wrap 125 provides exceptional thermal insulating capabilities by cooperating with lips 110a,b to form void space 120 as defined by the exterior of sidewall 115, lips 110a,b and wrap 125. As used herein, the term "non-hermetic" indicates that wrap 125 is not necessarily sealed to vessel 105 in an air tight arrangement. Rather, wrap 125 may simply be placed around vessel 105 and secured in a manner sufficient to retain wrap 125 in place. The current invention provides the desired insulating characteristics through a non-hermetic configuration. The configuration of the preferred embodiment provides reduced manufacturing costs when compared to hermetically sealed insulating containers. A related beneficial aspect of the current invention is evident in the event of a rip or tear in wrap 125. If wrap 125 is ripped or torn, container 100 will retain a significant portion of its insulating capabilities.

Referring to FIGS. 3, 3A, and 3B, a significant advantage of the current invention lies in the fact that wrap 125 does not need to provide any structural support to container 100. This is evidenced by the fact that when container 100 is laid on its side on a flat rigid surface 150, any resulting reaction forces are fully carried by vessel 105 and not by wrap 125. Thus, the structural properties of wrap 125 can be negligible without sacrificing the structural or insulating capabilities of container 100. As such, containers 100 can be stacked or packaged in cases without concern about the integrity of the vessels 105 or their insulating systems (e.g. void spaces 120 and wraps 125). In addition, when placed upon flat rigid surface 150 in any orientation container 100 will not require any structural support derived from wrap 125, i.e. when placed on a flat rigid surface 150, wrap 125 will not experience shear stresses.

Without wrap 125, vessel 105 is a non-insulated container. Thus, the insulating properties of the current invention are provided by a minute portion of the overall mass of insulating container 100. Further, in the preferred embodiment, wrap 125 does not contribute to the structural integrity of container 100. For a typical 16 ounce (0.47 liter) container, wrap 125 will generally comprise less than 50% and preferably less than 10% of the total mass of the container without adversely impacting the insulating or structural capabilities of the container.

In a preferred embodiment, wrap 125 is simply the product label that would have been used or has been used for non-insulated predecessors of container 100 (i.e. containers of similar size and shape, but not having exceptional thermal insulating capabilities). As such, the thickness of wrap 125 can readily be in the range of 0.005 inch (0.1 mm) to 0.015 inch (0.4 mm), but can, of course be thicker or thinner depending upon need and application.

Referring to FIGS. 4, 6, 8, 9, 11, 12, 14, 15, 17, 18, 21, 22, 35, 36, 38, 39, 41, 42, 44, 45, 47, 48, 50, 51, 68, 70, and 71, wrap 125 is omitted to more clearly depict the details of vessel 105. Similarly, referring to FIGS. 5, 7, 10, 13, 16, 32, 34, 37, 40, 43, 46, and 49, wrap 125 is shown partially cut away.

Figure 4:
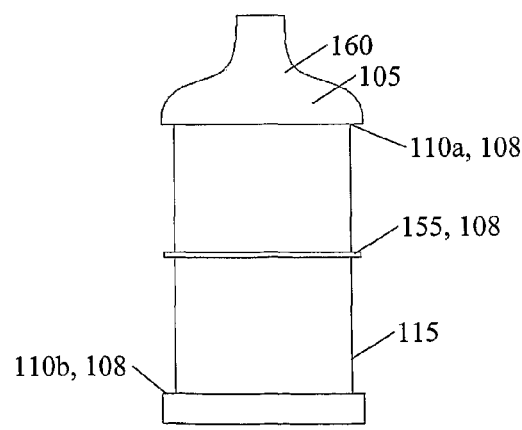
FIG. 4 is a front elevation view of one embodiment of the current invention.
Figure 14:
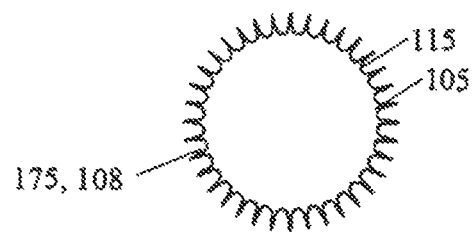
FIG. 14 is a section view of the embodiment shown in FIG. 12.
Figure 12:
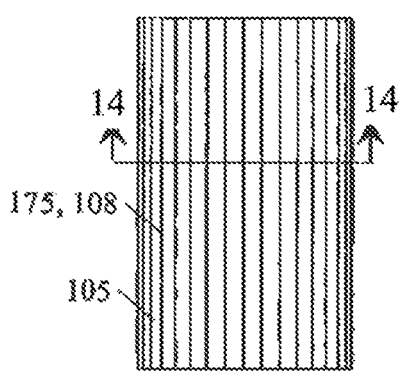
FIG. 12 is a front elevation view of one embodiment of the current invention.
Figure 13:
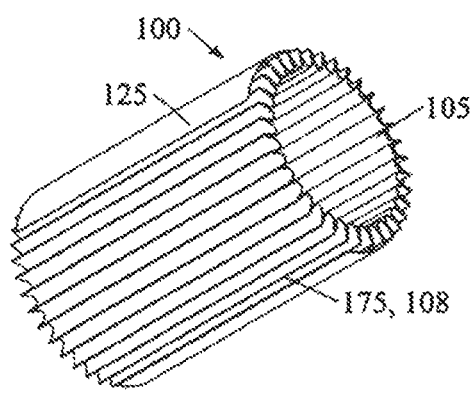
FIG. 13 is a side isometric view of the embodiment shown in FIG. 12.

In the embodiment of FIG. 4, protrusion 108 has the form of a circumferential rib 155. Thus, following positioning of wrap 125 container 100 has two void spaces 120.

Figure 71:
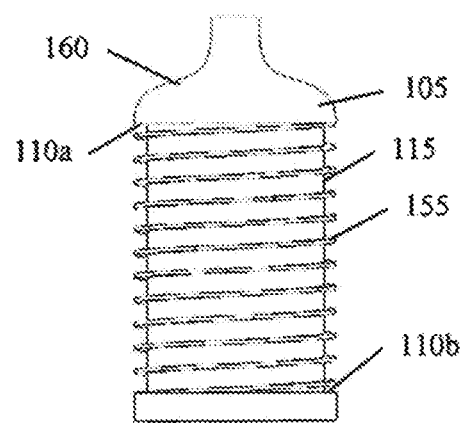
FIG. 71 is a front elevation view of one embodiment of the current invention.

Another embodiment of the current invention is depicted by FIG. 71 having a rib 155. In this embodiment single rib 155 spirals downward from upper lip 110a and connects to lower lip 110b. In this embodiment a single void space 120 is formed when wrap 125 is placed around vessel 105.

Referring to FIGS. 5 and 6, vessel 105 is shown having a plurality of ridges 155 thus creating a plurality of void spaces 120.

Figure 61:
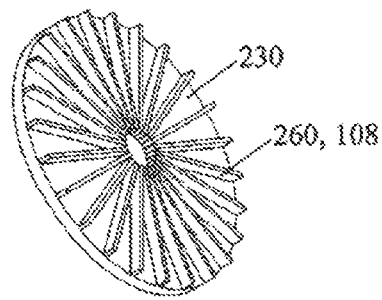
FIG. 61 is a side isometric view of lid 230.

Referring to FIGS. 5 to 9, 11 to 18, 32 to 35, and 37 to 51, vessel 105 is shown without a top to allow internal details of vessel 105 to be more clearly seen. In addition, container 100 can be configured with a variety of tops, including but not limited to a contoured top 160 depicted in FIG. 1 as a funnel type top, a frustoconical top 165 shown in FIG. 11, a flat top such as with a conventional soda can, or even with no top at all. In the absence of a top, container 100 can function as an open container, such as a cup, or can be fitted with a removable lid or even with an insulated lid 230 as shown in FIG. 61.

In another preferred embodiment, protrusions 108 are provided by corrugations 170 which are an integral part of sidewall 115. As shown in FIGS. 7 and 8, corrugations 170 are circumferential while the embodiment depicted in FIGS. 9-14 carries longitudinal corrugations 175.

Figure 17:
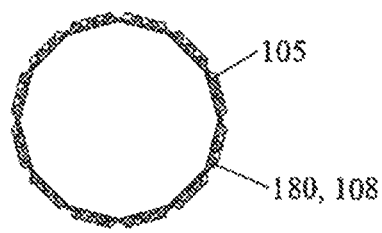
FIG. 17 is a section view of the embodiment shown in FIG. 15.
Figure 15:
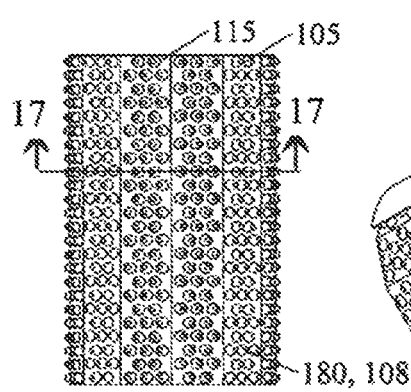
FIG. 15 is a front elevation view of one embodiment of the current invention.
Figure 16:
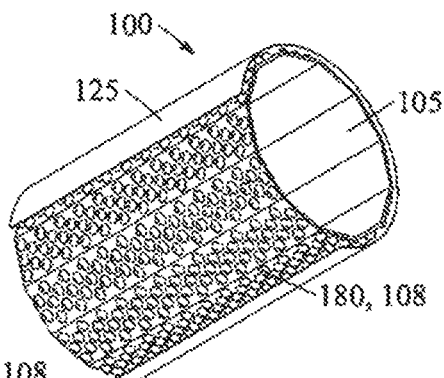
FIG. 16 is a side isometric view of the embodiment shown in FIG. 15.
Figure 21:
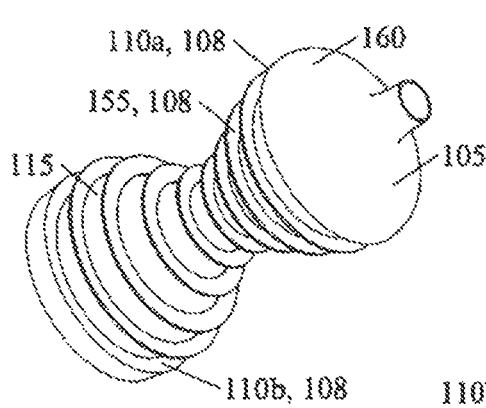
FIG. 21 is a side isometric view of the embodiment shown in FIG. 19 without wrap 125.

In another alternative embodiment, vessel 105 carries a plurality of protrusions 108 extending from the external face of sidewall 115. In the embodiment of FIGS. 15-17, protrusions 108 are generally hemispherical in nature; however, other geometric configurations such as but not limited to conical, frustoconical, or pyramidal are contemplated by the current invention. As shown by FIG. 21, hemispherical protrusions 180 carried by the exterior of sidewall 115 are matched to dome-like dimples 185 carried by the interior of sidewall 115.

FIGS. 19, 20, 21, and 22 depict another embodiment of the current invention wherein vessel 105 has a contoured sidewall 115 carrying a plurality of ridges 155. In this embodiment, wrap 125 preferably is a shrink-fit wrap such as heat-shrinkable Polyvinyl Chloride (PVC) or heat-shrinkable rubber.

Figure 24:
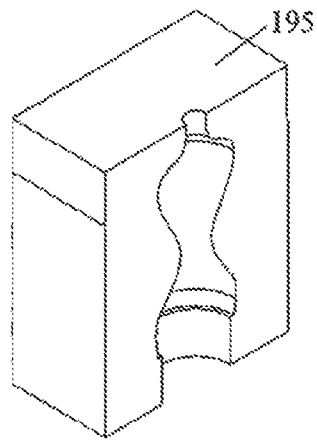
FIGS. 24 and 25 are side isometric views of two prior art mold halves for extrusion blow-molding the prior art container shown in FIG. 23.
Figure 25:
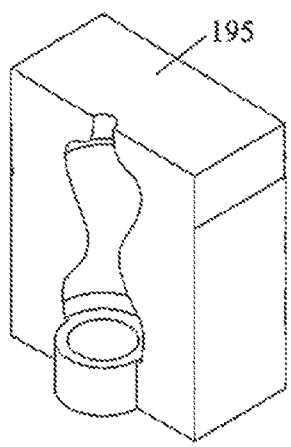
Figure 23:
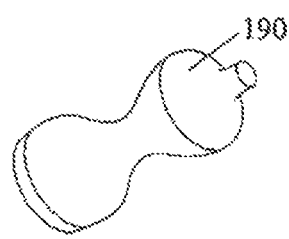
FIG. 23 is a side isometric view of a prior art non-thermal-insulating container.

In a preferred embodiment, the manufacture of the current invention advantageously utilizes existing molds such as are depicted in FIGS. 24 and 25. Molds depicted in FIGS. 24 and 25 are conventionally used to form a prior art container 190 as depicted in FIG. 23.

Figure 26:
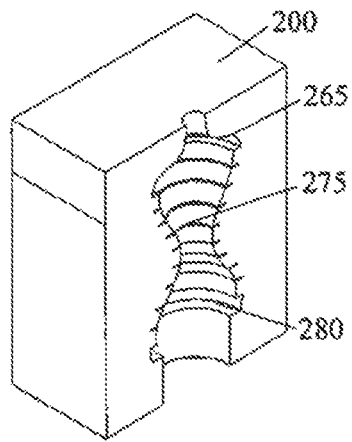
FIGS. 26 and 27 are side isometric views of two mold halves for extrusion blow-molding the embodiment shown in FIG. 22.
Figure 27:
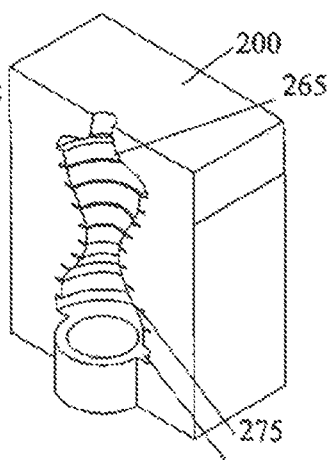
Figure 28:
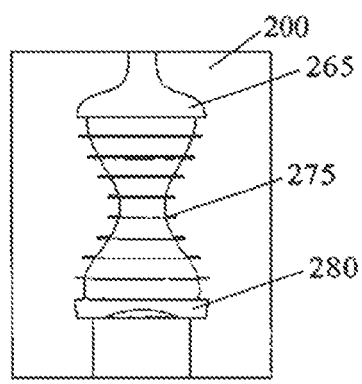
FIG. 28 is a front elevation view of the mold half shown in FIG. 27.

According to one preferred method of the present invention, prior art molds 195 are modified by a milling process to yield relief areas such as circumferential grooves 275 as depicted in FIGS. 26 and 27. Although FIGS. 26 and 27 depict grooves, one skilled in the art will recognize that relief areas suitable for forming a wide variety of protrusions 108 may be milled into molds 195 to yield the desired molds 200. In the embodiment depicted by FIGS. 26 and 27, circumferential grooves 275, bottom groove 280 and upper groove 265 have been milled into mold halves 195 to yield mold have 200. Typical milling processes known to those skilled in the art are suitable for practice in the method of the current invention. Additionally, the method may be practiced on conventional milling machines such as a vertical milling machine or a CNC milling machine.

The net result of such retooling would be vessel 105 having the same general size and shape as its non-insulated predecessor, such as bottle 190, but possessing exceptional thermal insulating capabilities when combined with wrap 125. And, whereas nearly all containers sold commercially utilize a product label, in most instances the same product label (as was used on the non-insulated predecessor) can easily function as wrap 125 thus requiring no additional process steps and no new raw material sources.

Figure 29:
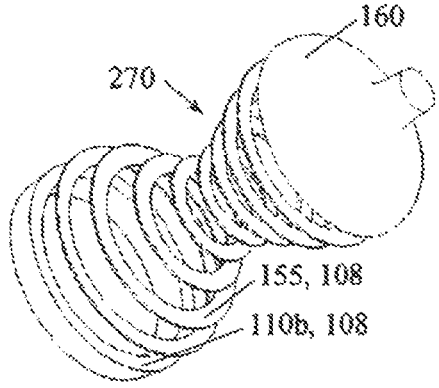
FIG. 29 is a side isometric view of additional material to be added to the prior art container shown in FIG. 23 to make it equivalent to the embodiment shown in FIG. 22.
Figure 30:
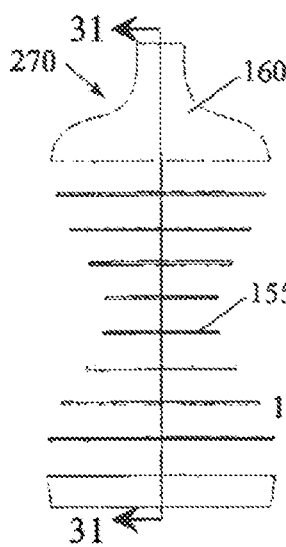
FIG. 30 is a front elevation view of the additional material shown in FIG. 29.
Figure 31:
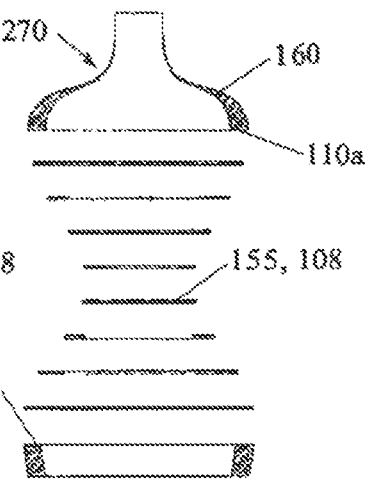
FIG. 31 is a section view from FIG. 29.

In addition, when existing molds for non-insulated containers wear out, new molds can be easily designed and tooled such that the general size and shape of the non-insulated predecessor can be easily retained. As with the retooling example described above, no additional manufacturing equipment and no additional raw materials sources would be necessary to fully convert from a non-insulated container to thermal insulating container 100 having exceptional insulating properties FIGS. 29-30 depict the material added to the bottle 190 to yield vessel 105 of the current invention. In terms of molds 195, fictitious vessel 270 represents the additional mold material that must be removed from prior-art mold halves 195 to yield mold halves 200. This can be seen wherein the circumferential ridges 155 of fictitious vessel 270 correspond to circumferential grooves 275 of mold halves 200. Similarly, lip 110b at the bottom of fictitious vessel 270 is formed by bottom groove 280 of mold halves 200 and the modified contour top 160 and upper lip 110a are together formed by upper contour groove 265.

Thus, in a preferred embodiment, the method for manufacturing vessel 105 entails the step of preparing mold 200 for forming vessel 105 according to conventional methods or obtaining a standard vessel-forming mold 195. Subsequently, a milling step is carried out to remove sufficient material from either mold 195 or 200 corresponding to the geometry of the desired protrusion 108 to be carried by sidewall 115 of vessel 105. Thereafter, vessel 105 is formed using mold 200 by techniques such as extrusion blow molding. Formed vessel 105 is removed from mold 200 and wrap 125 placed around vessel 105 thereby forming void spaces 120.

Figures 34, 35:
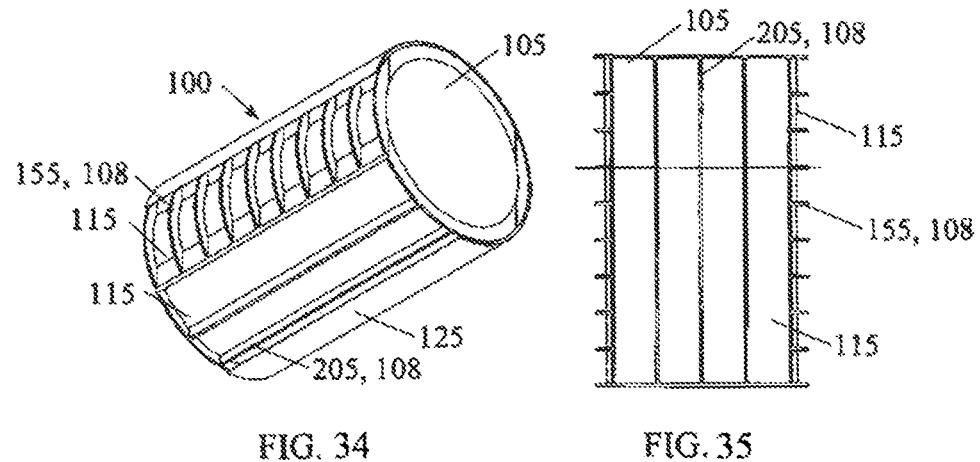
FIG. 34 is a side isometric view of one embodiment of the current invention.
FIG. 35 is a front elevation view of the embodiment shown in FIG. 34.
Figure 36:
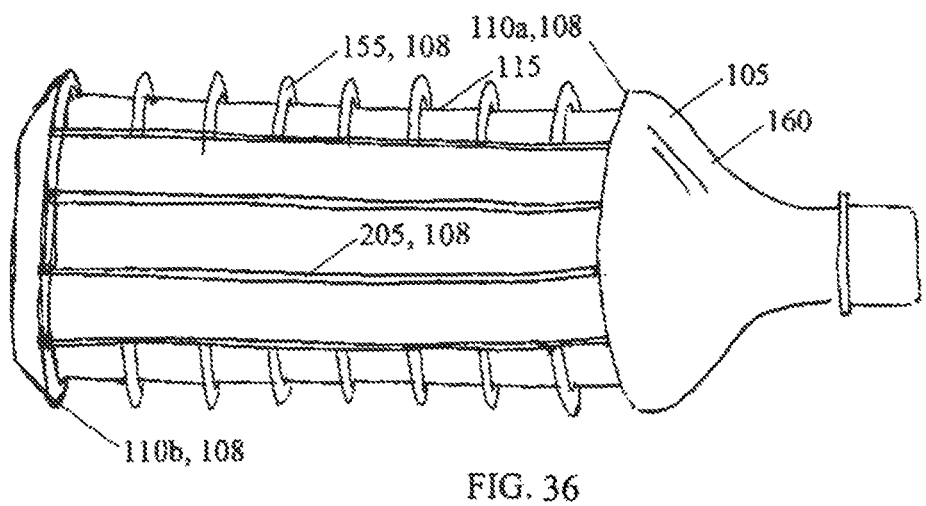
FIG. 36 is a side view of one embodiment of the current invention.

Although longitudinally extending ridges 205 provide the desired insulating properties in the current invention, they create difficulty for manufacturability whenever a two-part mold is desired, such as with an extrusion blow molding process. To accommodate mold separation and removal of vessel 105 from a two-part mold, longitudinal ridges 205 are preferably positioned parallel to one another and perpendicular to the mating faces of the mold halves (not shown). Referring to FIGS. 34 to 36, longitudinal ridges 205 are shown in a preferred configuration. In addition, partial circumferential ridges 155 are shown extending between longitudinal ridges 205 outward from sidewall 115 and on opposite sides of vessel 105.

Referring to FIGS. 35, 36, 38, 41, 44, 47, 50, and 55, the paper on which the FIGS. are drawn represents the imaginary plane that would be formed by the mating faces of two mold halves. In other words, the embodiments represented by these FIGS. can be readily manufactured via a process using two-part molds. For example, when practicing extrusion blow molding the two mold halves will readily separate one from the other and the formed vessel 105 will readily separate from each mold half.

In FIGS. 37 to 51, partial circumferential ridges 155 are shown on opposite sides of vessel 105 with various types of protrusions 108 extending outward from sidewall 115, with protrusions 108 being essentially extruded parallel to one another (i.e. perpendicular to an imaginary parting plane, which would be the parting plane between the mating faces of two mold halves).

Figure 39:
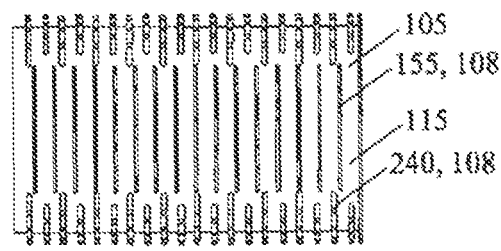
FIG. 39 is a side view of the embodiment shown in FIG. 37.
Figure 37:
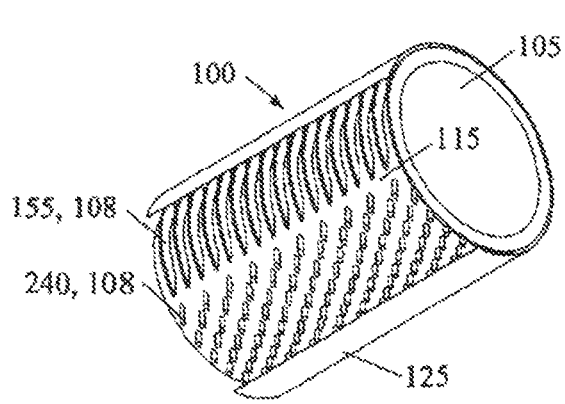
FIG. 37 is a side isometric view of one embodiment of the current invention.
Figure 38:
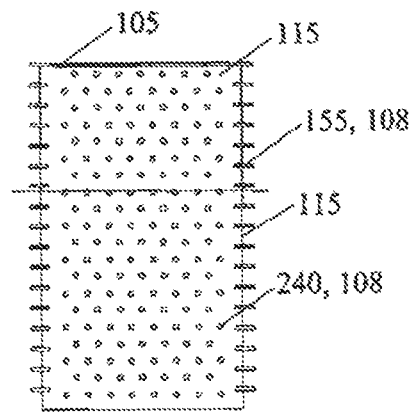
FIG. 38 is a front elevation view of the embodiment shown in FIG. 37.

In FIGS. 37 to 39, the current invention carries rod-like protrusions 240 extending outward from sidewall 115 parallel to one another and perpendicular to an imaginary parting plane.

Figure 42:
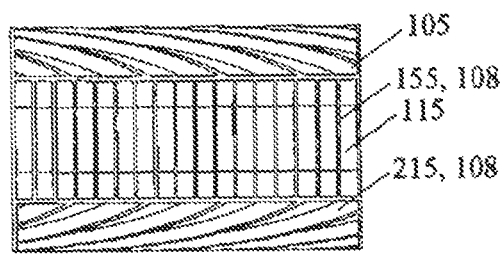
FIG. 42 is a side view of the embodiment shown in FIG. 40.
Figure 40:
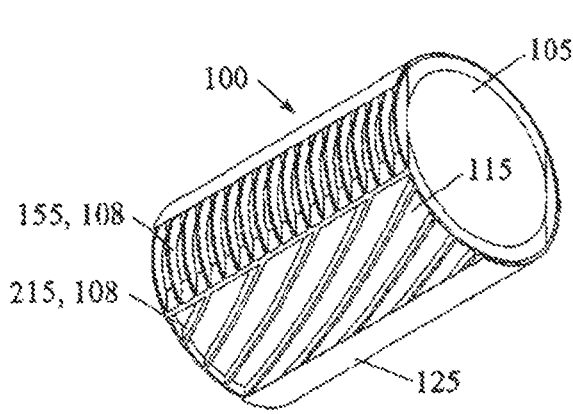
FIG. 40 is a side isometric view of one embodiment of the current invention.
Figure 41:
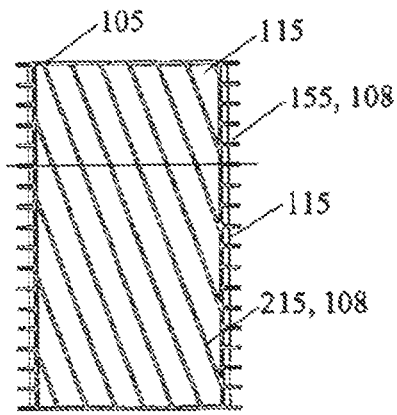
FIG. 41 is a front elevation view of the embodiment shown in FIG. 40.

Similarly in FIGS. 40 to 42, protrusions 108 are in the form of diagonal ridges 215 extending outwardly from sidewall 115 and parallel to one another and perpendicular to an imaginary parting plane.

Figure 45:
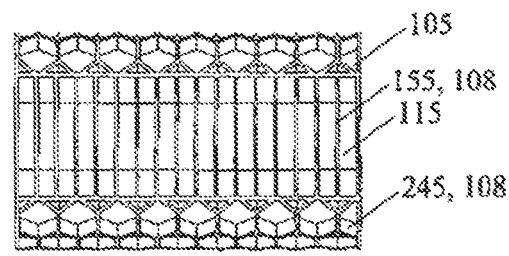
FIG. 45 is a side view of the embodiment shown in FIG. 43.
Figure 43:
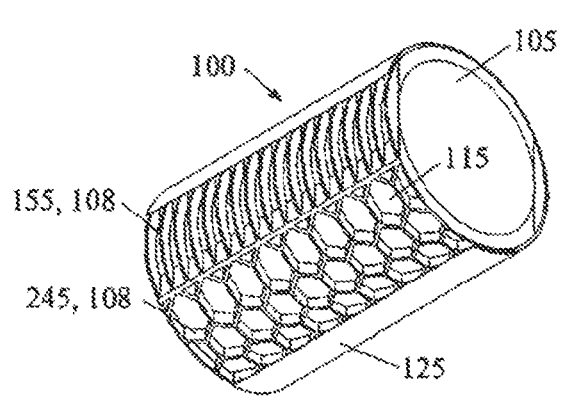
FIG. 43 is a side isometric view of one embodiment of the current invention.
Figure 44:
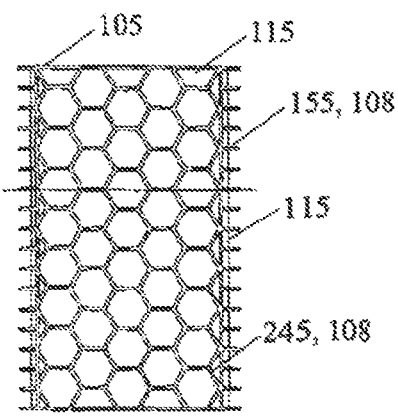
FIG. 44 is a front elevation view of the embodiment shown in FIG. 43.

Likewise in FIGS. 43 to 45, interconnected ridges 245 extend outward from sidewall 115 parallel to one another and perpendicular to an imaginary parting plane. As shown in FIG. 43, the preferred embodiment includes at least a portion of ridges 245 interconnected in a preferred honeycomb pattern while another portion of ridges 155 run laterally, i.e. circumferentially, around at least a portion of surface 115. Preferably, ridges 155 correspond to the area of the parting plane between the mating faces of molds 200. Thus, this embodiment of the current invention will minimize the effort required to separate molds 200 and allow for easier removal of vessel 105 from molds 200.

Figure 48:
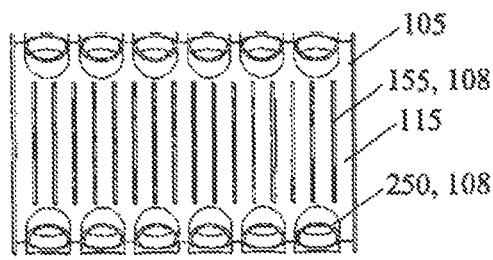
FIG. 48 is a side view of the embodiment shown in FIG. 46.
Figure 46:
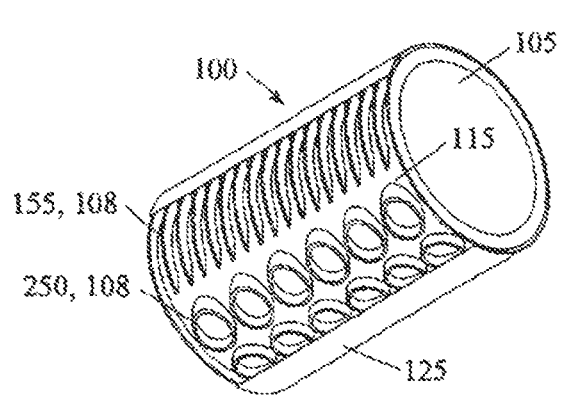
FIG. 46 is a side isometric view of one embodiment of the current invention.
Figure 47:
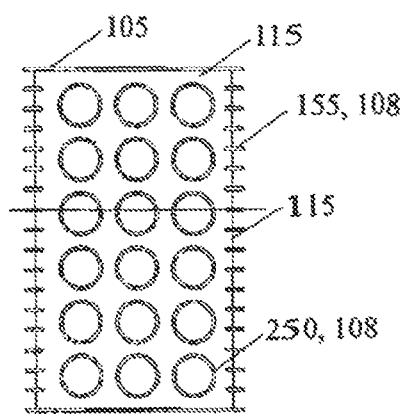
FIG. 47 is a front elevation view of the embodiment shown in FIG. 46.

Referring to FIGS. 46 to 48, geometric ridges 250 extend outward from sidewall 115 parallel to one another and perpendicular to an imaginary parting plane. Geometric ridges 250 are shown to be generally circular in this embodiment, but can take any number of bounded shapes such as elliptical, triangular, rectangular, hexagonal, amoebae-like, etc. In addition, though not shown, unbounded, or broken, ridges can be readily utilized without departing from the spirit or scope of the current invention.

FIGS. 49 to 51 depict yet another embodiment of the current invention wherein, diagonal ridges 215 extend outward from sidewall 115 parallel to one another and perpendicular to an imaginary plane. In addition, character-shaped ridges 255 extend outward from sidewall 115 parallel to one another and perpendicular to the same imaginary parting plane. Script or character-shaped ridges 255 can be desirably fashioned to form recognizable patterns such as alpha-numeric characters, words, logos, pictures, or other distinguishable marks. Such configurations can help to identify the brand or portray other information about of the contents of vessel 105. In addition, wrap 125 can be desirably fashioned with one or more translucent regions to allow the information from the underlying ridges 255 to be readily viewed by a consumer or simply to allow the consumer to appreciate the aesthetics of the underlying protrusions regardless of their type or configuration.

Referring to protrusions 108 related to the current invention, a preferred embodiment desirably uses protrusions 108 in the form of ridges 155, 205, 215, 245, 250, 255 or 260 wherein said elements generally have widths of about 0.25 mm to 2.5 mm and extend outward from sidewall 115 a depth between about 2 mm and about 12 mm. However, other depths and widths may be desirable for other embodiments. For instance, the embodiment depicted in FIGS. 56-64 desirably uses radial ridges 260 having widths of about 2 mm to 12 mm with wider ridges 260 being desirable for larger bowls 220. In addition, for certain methods of manufacture, such as those requiring use of a mold, said ridges 155, 205, 215, 245, 250, 255, or 260 are desirably formed with a draft angle, such as 0.5- to 5-degrees, as may improve removability of vessel 105 from a mold. The total surface area provided by protrusions 108, including other forms thereof, is about 6% to 165% of the area of sidewall 115 lacking protrusions 108. Preferably, protrusions 108 increase the total surface area of sidewall 115 by about 30% to about 100%.

Referring to FIGS. 67-70, container 100 is shown wherein protrusions 108 (in this instance, interconnected ridges 245) desirably protrude inward (i.e. into the interior of vessel 105), and wrap 125 is placed inside vessel 105 and comprises a closed-bottom configuration capable of holding a beverage, food item, or other items or objects needing to be insulated.

Figure 54:
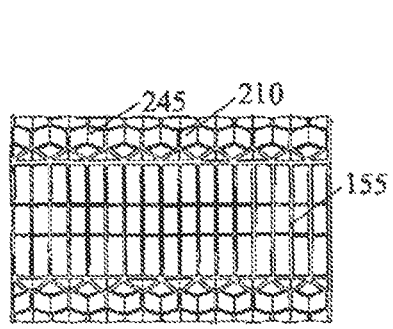
FIG. 54 is a side view of sleeve 210.
Figure 55:
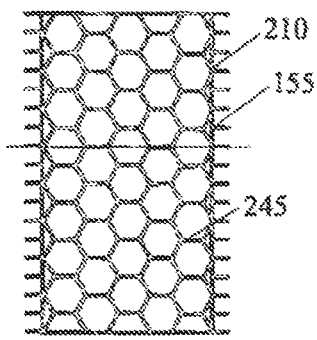
FIG. 55 is a front elevation view of sleeve 210.

Referring to FIGS. 52 and 53, an embodiment is shown which is a thermal insulating container 100 comprising vessel 105 having a sleeve 210 positioned therearound with sleeve 210 having wrap 125 positioned therearound. In this embodiment, sleeve 210 is fashioned to have interconnected ridges 245 wherein a plurality of void spaces 120 are created between exterior sidewall 115 of vessel 105 and an external environment by virtue of sleeve 210 and wrap 125. As with the other embodiments presented herein, void spaces 120 need not be hermetic. Thus, either sleeve 210 can be loosely secured to vessel 105 or wrap 125 can be loosely secured to sleeve 210. Referring to FIGS. 54 and 55, sleeve 210 is shown separately. Thus, in this embodiment of the current invention, protrusions 108 are not integrally formed on the exterior surface of sidewall 115.

Figure 56:
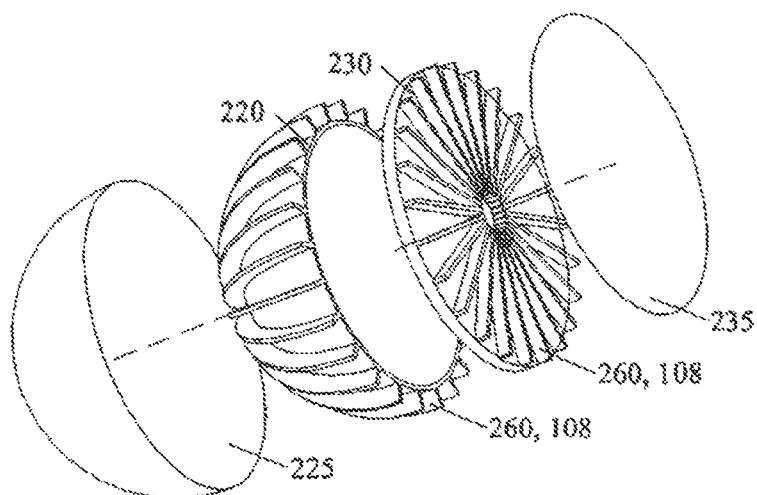
FIG. 56 is a side isometric exploded view of one embodiment of the current invention.

Referring to FIG. 56, an embodiment is shown which is a thermal insulating container 100 comprising a vessel 105 and wrap 125 wherein vessel 105 comprises an inner bowl 220 having protrusions 108 taking the form of radial ridges 260 protruding from the exterior surface of inner bowl 220, and wrap 125 comprises an outer bowl 225 desirably shaped to mate with inner bowl 220 to create a plurality of void spaces 120. Also shown is lid 230 that is desirably secured to a cover 235 wherein cover 235 and lid 230 cooperate to form a plurality of void spaces 120 by virtue of radial ridges 260 protruding from one of the faces of lid 230. Lid 230 may optionally carry a circumferential lip (not shown). The desirability of this embodiment stems from the need to keep certain food items, such as a gelatin-based dessert, potato salad, cole slaw, and the like, cold for extended time periods.

Figure 57:
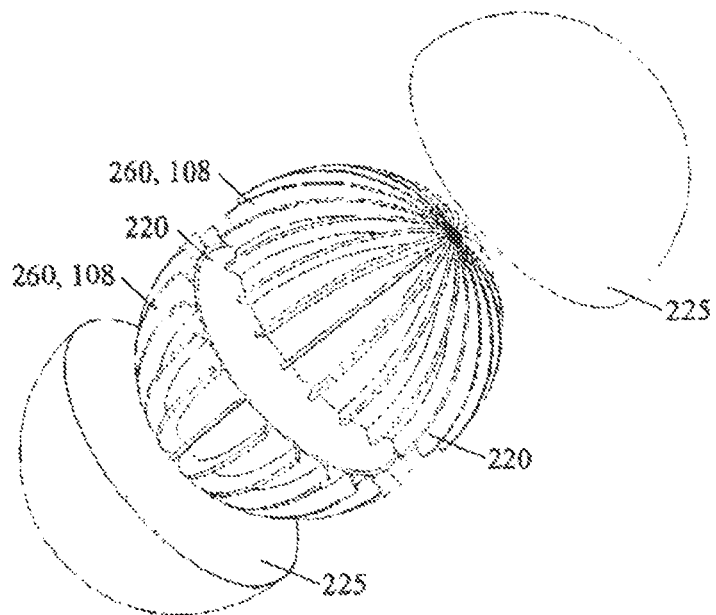
FIG. 57 is a side isometric exploded view of one embodiment of the current invention.

Referring to FIG. 57, an embodiment is shown wherein inner bowl 220 and outer bowl 225 desirably mate to a second inner bowl 220 and a second outer bowl 225. The desirability of this embodiment stems from the need to keep certain spherical items cold, such as an apple, orange, or head of lettuce.

With continued reference to FIGS. 56 and 57, in one preferred embodiment inner and outer bowls 220, 225 may be permanently secured together. However, significant advantages may be derived by providing for the separability of bowls 220, 225. For example, many desserts such as gelatins must be cooled prior to serving in order to achieve the desired consistency. If such desserts are placed within bowl 220 without the presence of bowl 225 and subsequently refrigerated, the desserts will cool at a faster rate due to increased heat flow from the contents through bowl 220 and radial ridges 260. In this instance, radial ridges 260 act as a heat sink enhancing the transfer of heat energy from food stored within bowl 220. Accordingly, food stored and refrigerated in bowl 220 cools at a faster rate than when stored in a bowl of equivalent material and dimensions lacking radial ridges 260. This example demonstrates the heat dissipating ability of the current invention through an element which also serves as an integral part of the invention's insulating system, i.e. ridges 155, 205, 215, 245, 250, 255 or 260 or other suitable protrusions 108. Thus, the current invention provides the ability to enhance food preparation and food preservation.

In similar fashion, when the current invention is used in a beverage bottling process, in particular a hot-filled beverage bottling process, the additional surface area created by the protrusions 108 will increase the rate of heat loss from the hot-filled beverage vessels 105, thus allowing them to be handled and transported more rapidly. Then, once wraps 125 are applied to vessels 105, the rate of heat transfer will be greatly reduced, thus creating a reversal effect such that once the beverages are chilled, they will stay colder longer, a second desirable effect. An example process for hot-filling a beverage into a thermal-insulating container in accordance with the current invention is as follows:
  (a) heat the beverage,
  (b) place the beverage into a bottle wherein said bottle has one or more heat-dissipating protrusions extending outward therefrom,
  (c) allow said bottle and said beverage to cool, and
  (d) place a wrap around said bottle wherein said wrap and said protrusions cooperate to form one or more void spaces between said wrap and the sidewall of said bottle.

Figure 60:
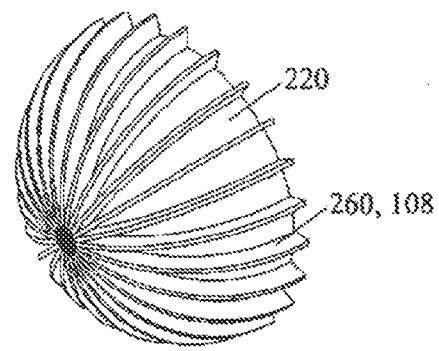
FIG. 60 is a side isometric view of inner bowl 220.
Figure 58:
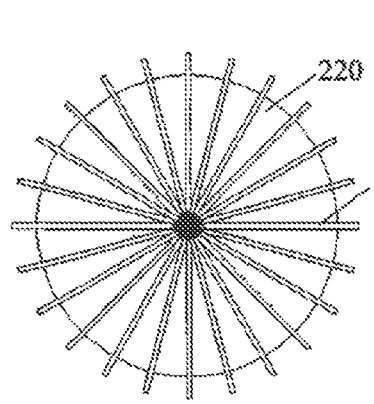
FIG. 58 is a bottom view of inner bowl 220.
Figure 59:
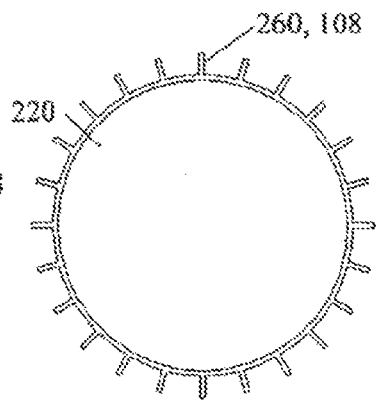
FIG. 59 is a top view of inner bowl 220.
Figure 62:
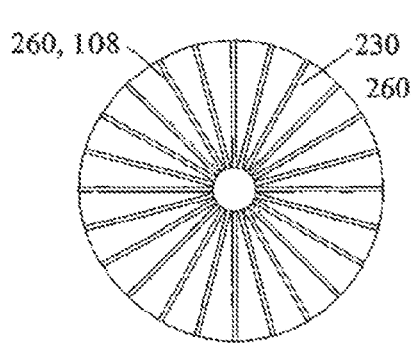
FIG. 62 is a top view of lid 230.
Figure 63:
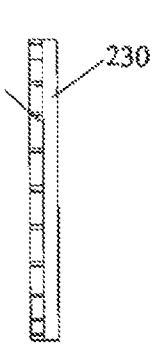
FIG. 63 is a side view of lid 230.
Figure 64:
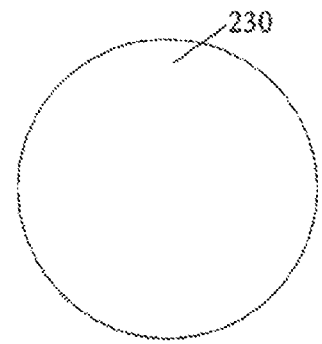
FIG. 64 is a bottom view of lid 230.

Referring to FIGS. 58 to 60, radial ridges 260 are shown. However, as with the other embodiments disclosed herein, any number of different types of protrusions 108, such as circumferential ridges 155, circumferential corrugations 170, longitudinal corrugations 175, dome-like protrusions 180, rod-like protrusions 240, interconnected ridges 245, geometric ridges 250, etc. can be employed to effectuate the same beneficial results, namely increased heat transfer rates in the absence of outer bowl 225 or in the absence of wrap 125 and decreased heat transfer rates in the presence of outer bowl 225 or the presence of wrap 125 (as compared to similarly shaped and sized non-insulated containers).

Another advantage of the current invention relates to the need for applying heat-shrinkable labels using dry hot-air rather than steam. Prior-art methods for applying heat-shrinkable labels to beverage bottles require the labels to be applied to empty bottles if dry hot-air is to be used, such as in a dry hot-air tunnel. If the bottles have already been filled, the heat-shrinkable labels tend to resist fully shrinking to the shape of the bottle because the liquid inside the bottles draws heat away from the labels before they can fully conform to the shape of the bottle. The current invention overcomes this problem because the void spaces 120, even though not fully formed when the heat shrinking process begins, act to insulate the ever-shrinking label from the liquid, thus allowing the heat-shrinkable label to fully shrink even when using dry heat processes, thus allowing the labels to properly conform to the contours of the vessel 105.

Figure 22:
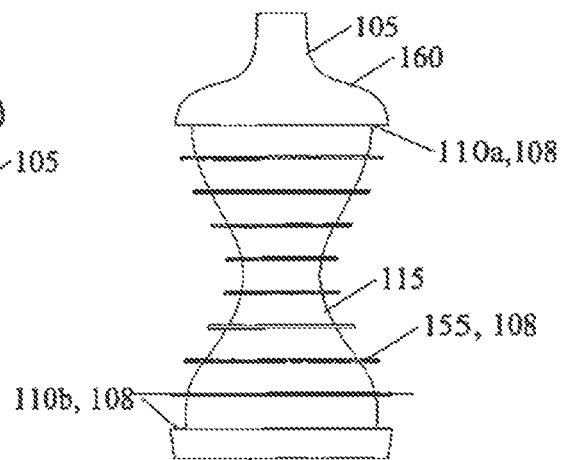
FIG. 22 is a front elevation view of the embodiment shown in FIG. 19 without wrap 125.

Although numerous embodiments of the current invention can be readily configured with wrap 125 being a heat-shrinkable material, vessels 105 having irregularly-shaped or contoured sidewalls 115, such as vessel 105 shown in FIG. 22, are particularly well-suited for wraps 125 that are heat-shrinkable or shrink-fit product labels. These and similar embodiments meet a marketing need wherein a container's insulating features can be stylistically used for enhanced branding and improved consumer brand recognition.

Figure 65:
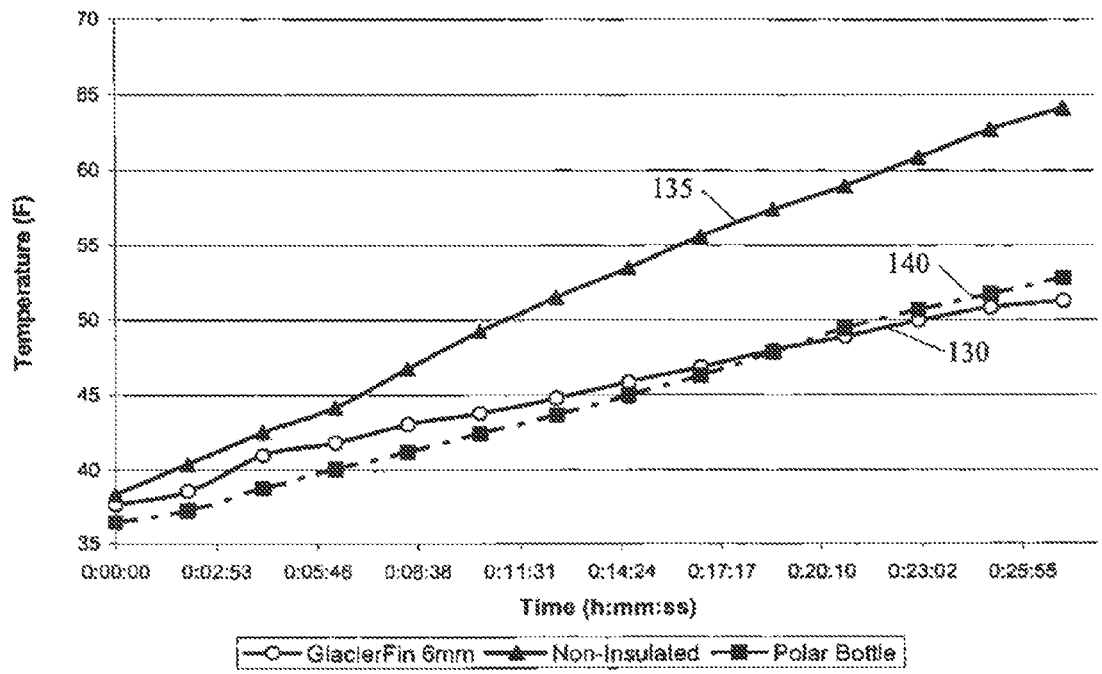
FIG. 65 is a graph showing the temperature rise of a cold beverage in a non-insulated bottle compared to a cold beverage in a container fabricated in accordance with a preferred embodiment of the current invention compared to a cold beverage in a prior-art insulated container.
Figure 66:
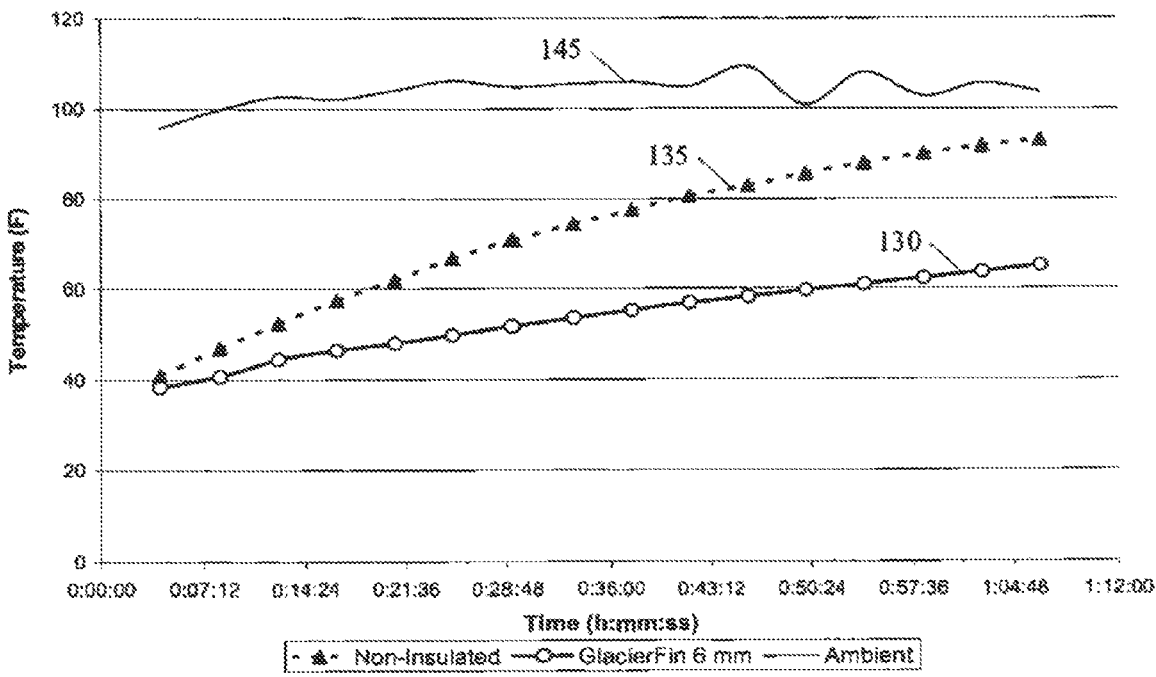
FIG. 66 is a graph showing the temperature rise of a cold beverage in a non-insulated bottle compared to a cold beverage in a container fabricated in accordance with a preferred embodiment of the current invention.
Figure 67:
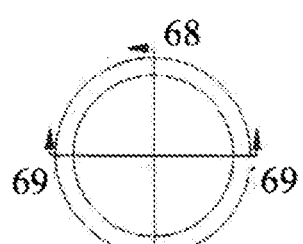
FIG. 67 is a top view of one embodiment of the current invention.
Figure 68:
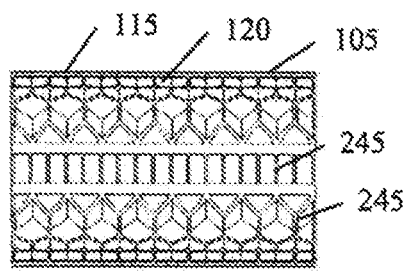
FIG. 68 is a section view from FIG. 67.
Figure 69:
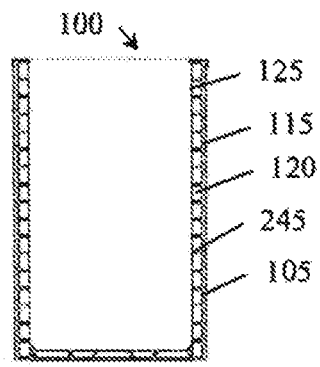
FIG. 69 is a section view from FIG. 67.
Figure 70:
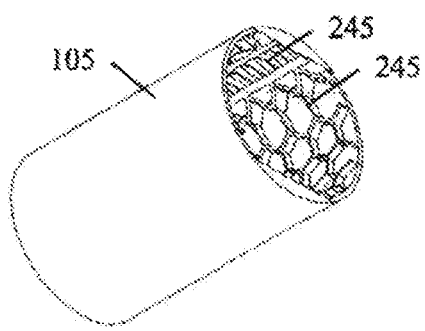
FIG. 70 is a side isometric view of the embodiment shown in FIG. 67.

As noted previously, the present invention preferably does not utilize a hermetic seal to provide thermal insulating capabilities. As will be appreciated by those skilled in the art, the elimination of the hermetic seal can substantially reduce the cost of manufacturing thermally insulated container 100. The efficiency of the present invention is demonstrated by FIG. 65. As represented by the chart in FIG. 65, a cold beverage initially at 34° F. (1° C.) was stored in a preferred embodiment of the current invention and in a non-insulated bottle. The bottles were exposed to ambient conditions of approximately 100° F. (38° C.) and an air current of approximately 10 mph (4.5 m/s). After 30 minutes, the beverage stored in the container 100 of the current invention (as represented by temperature profile 130) was approximately 12° F. (7° C.) cooler than the same beverage stored in the non-insulated bottle (as represented by temperature profile 135). Additionally, the beverage stored in the insulated container 100 of the current invention (identified as GlacierFin) demonstrated less heat transfer than the same beverage stored in an insulated bottle having a hermetically-sealed void space (as represented by temperature profile 140). As shown by FIG. 65, the beverage in the insulated container 100 of the current invention remained approximately 2° F. (1° C.) cooler than the beverage stored in the hermetically-sealed insulated bottle marketed under the trade name POLAR BOTTLE by Product Architects, Inc. of Boulder, Colo. Finally, as demonstrated by FIG. 66, ambient temperature profile 145, the beverage stored in the present invention remained approximately 23° F. (13° C.) cooler than the beverage stored in a non-insulated container after just over an hour of exposure to ambient temperatures in excess of 100° F. (38° C.). Thus, as demonstrated by the FIGS. 65 and 66, the current invention provides thermal insulating capabilities without hermetically-sealed void spaces which are comparable to the thermal insulation of a container having a hermetic seal.

In another preferred embodiment, the current invention incorporates a thermochromatic material into wrap 125 and/or sidewall 115. As is known to those skilled in the art, thermochromatic materials can be selected to change color at predetermined temperatures. In this embodiment, sidewall 115 may be fabricated using a plastic incorporating thermochromatic compounds selected to change color for example at a temperature representing a palatable beverage temperature such as 60° F. (16° C.). When the thermochromatic compound is incorporated into sidewall 115, wrap 125 preferably includes at least a region of translucent material enabling inspection of sidewall 115. If desired, two or more regions of sidewall 115 may incorporate thermochromatic compounds representing differing temperature points. For example, a marketer may wish to demonstrate that a beverage is truly being sold at a cold temperature such as 40° F. (4° C.) while also demonstrating that the container reduces warming of the beverage. In this instance, a first thermochromatic region may be provided in sidewall 115 corresponding to the 40° (4° C.) temperature while a second region corresponds to a warmer but acceptable temperature such as 60° F. (16° C.). Alternatively, wrap 125 may be used to demonstrate the first colder temperature while sidewall 115 demonstrates the second warmer temperature. Other combinations of thermochromatic compounds in wrap 125 and sidewall 115 are also contemplated by the current invention.

Table 1 below shows the relative increases in material volume and sidewall surface area for various embodiments of the current invention. The increases shown are relative to non-insulating containers having similar size and shape, but not having any lips 110*a,b* or other protrusions 108, such as ridges 155, 205, 215, 245, 250, 255 or 260, dome-like protrusions 180, etc. As can be seen by Table 1, the various embodiments disclosed herein represent a wide range of possibilities in terms of material volumes and sidewall surface areas. The relative increase in material volumes is typically modest, thus allowing the current invention to be implemented with only a modest increase in cost over similar but non-insulating containers. The very wide range of increases in sidewall surface areas provides a great deal of flexibility when choosing specific embodiments for a given application. For instance, in those applications where rapid cooling of hot-filled beverage bottles is required prior to labeling or transport, those embodiments offering the greatest increase in sidewall surface area would be preferable.

TABLE 1

Figure 18:
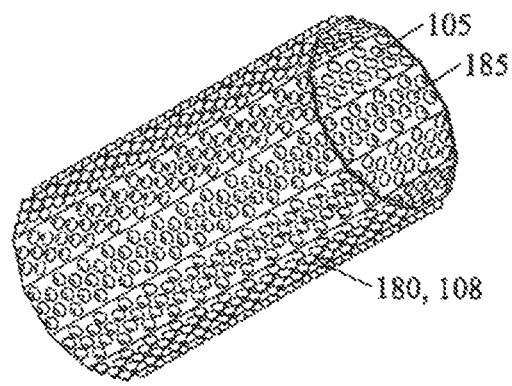
FIG. 18 is a side isometric view of one embodiment of the current invention.
Figure 19:
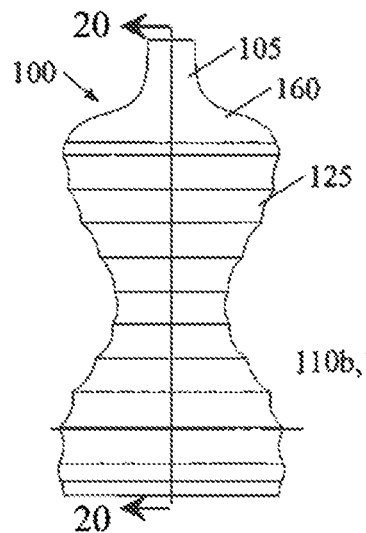
FIG. 19 is a front elevation view of one embodiment of the current invention.
Figure 20:
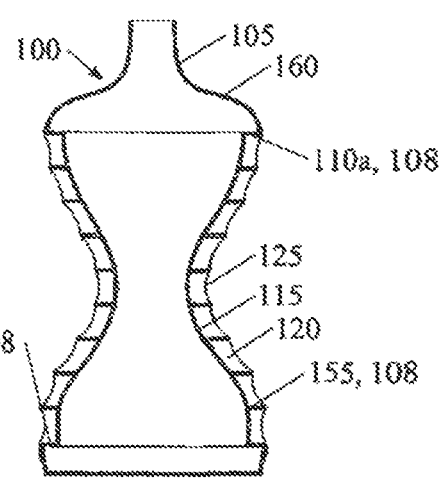
FIG. 20 is a section view of the embodiment shown in FIG. 19.
Figures 32, 33:
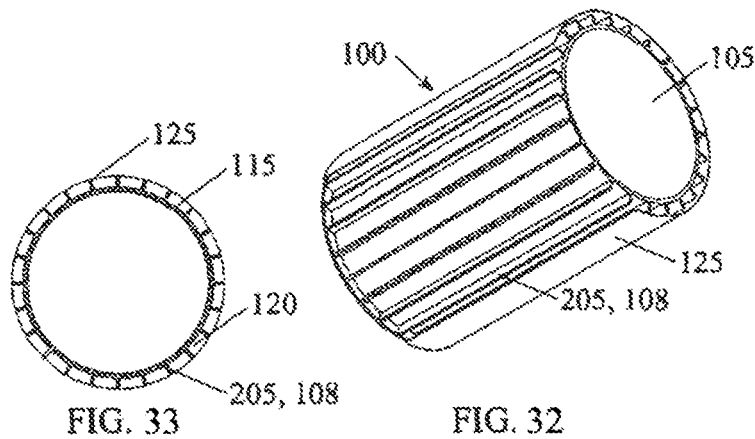
FIG. 32 is a side isometric view of one embodiment of the current invention.
FIG. 33 is a top view of the embodiment shown in FIG. 32.

|  | Material Volume without Protrusions in3 | Material Volume with Protrusions in3 | Increase in Material | Sidewall Surface Area without Protrusions in2 | Sidewall Surface Area with Protrusions in2 | Increase in Sidewall Surface Area |
| --- | --- | --- | --- | --- | --- | --- |
| FIGS. 1-2 | 8.19 | 8.74 | 6% | 100.4 | 106.3 | 6% |
| FIG. 4 | 8.19 | 9.01 | 9% | 100.4 | 112.2 | 12% |
| FIGS. 5-6 | 5.84 | 7.49 | 22% | 66.0 | 132.8 | 101% |
| FIGS. 7-8 | 5.84 | 10.19 | 43% | 66.0 | 99.8 | 51% |
| FIGS. 9-11 | 3.71 | 6.05 | 39% | 59.4 | 104.4 | 76% |
| FIGS. 15-17 | 3.50 | 6.73 | 48% | 57.0 | 74.8 | 31% |
| FIG. 18 | 3.50 | 4.20 | 17% | 57.0 | 74.8 | 31% |
| FIGS. 19-22 | 3.75 | 5.59 | 33% | 77.6 | 140.0 | 80% |
| FIGS. 32-33 | 5.84 | 7.41 | 21% | 66.0 | 128.8 | 95% |
| FIGS. 34-35 | 5.84 | 7.27 | 20% | 66.0 | 121.3 | 84% |

TABLE 1-continued

| | Material Volume without Protrusions in3 | Material Volume with Protrusions in3 | Increase in Material | Sidewall Surface Area without Protrusions in2 | Sidewall Surface Area with Protrusions in2 | Increase in Sidewall Surface Area |
|---|---|---|---|---|---|---|
| FIGS. 37-39 | 3.71 | 5.22 | 29% | 59.4 | 120.4 | 103% |
| FIGS. 40-42 | 5.84 | 8.16 | 28% | 66.0 | 154.8 | 135% |
| FIGS. 43-45 | 5.84 | 8.60 | 32% | 66.0 | 166.8 | 153% |
| FIGS. 46-48 | 5.84 | 7.63 | 23% | 66.0 | 139.8 | 112% |
| FIGS. 49-51 | 5.84 | 8.62 | 32% | 66.0 | 172.8 | 162% |

Other embodiments of the current invention will be apparent to those skilled in the art from a consideration of this specification or practice of the invention disclosed herein. However, the foregoing specification is considered merely exemplary of the current invention with the true scope of the current invention being defined by the following claims.

We claim:

1. An insulated container comprising:
a vessel, comprising a bottom wall and a sidewall extending longitudinally from said bottom wall, said sidewall having an upper end, said sidewall and said bottom wall having an interior and an exterior surface wherein the interior surfaces of said sidewall and said bottom wall define the interior of said vessel;
a first outwardly extending lip carried by said bottom wall;
a second outwardly extending lip carried by said top of said sidewall;
a plurality of integral protrusions extending outwardly from the exterior of said sidewall; and
a wrap positioned around said vessel whereby said wrap cooperates with said first and second outwardly extending lips and protrusions thereby defining a plurality of void spaces between the exterior surface of said sidewall and said wrap, wherein the depth of said void spaces is generally between about 4 mm and about 12 mm to provide the insulating properties to said container.

2. The container of claim 1, wherein the depth of said void spaces is generally between about 7 mm to about 12 mm.

3. The container of claim 1, wherein said vessel has the characteristics of a vessel prepared by a process selected from the group consisting of: injection blow molding, stretch blow molding, injection molding, thermoforming, vacuum forming, pressure forming, rotational molding, twin sheet forming, stereo lithography, glass blowing, carving, metal casting, and liquid resin casting.

4. The container of claim 1, wherein said sidewall includes a plurality of corrugations, said corrugations are an integral part of said sidewall, and said corrugations provide said plurality of exterior protrusions on the exterior of said sidewall.

5. The container of claim 1, wherein said protrusions increase the overall surface area of the exterior of said sidewall by between about 30% to about 165%.

6. The container of claim 1, wherein said protrusions increase the overall surface area of the exterior of said sidewall by between about 6% to about 100%.

7. The container of claim 1, wherein said void spaces are non-hermetic.

8. An insulated container comprising:
a vessel, comprising a bottom wall and a sidewall, the sidewall having a substantially consistent thickness extending longitudinally from said bottom wall, said sidewall having an upper end, said sidewall and said bottom wall having an interior and an exterior surface wherein the interior surfaces of said sidewall and said bottom wall define the interior of said vessel;
an outwardly extending lip carried by said top of said sidewall;
said sidewall formed from a plastic material and further defined by a plurality of integral protrusions extending outwardly from the exterior of said sidewall, said integral protrusions having corresponding recesses on the interior surface of said sidewall, said integral protrusions do not substantially increase the thickness of said plastic material of said sidewall; and
a wrap positioned around said vessel whereby said wrap cooperates with said protrusions and said outwardly extending lip thereby defining a plurality of void spaces between the exterior surface of said sidewall and said wrap, wherein the depth of said void spaces is generally between about 4 mm and about 12 mm to provide the insulating properties to said container.

9. The container of claim 8, wherein the depth of said void spaces is generally between about 7 mm to about 12 mm.

10. The container of claim 8, wherein said vessel has the characteristics of a vessel prepared by a process selected from the group consisting of:
injection blow molding, stretch blow molding, thermoforming, vacuum forming, pressure forming and rotational molding.

11. The container of claim 8, wherein said protrusions increase the overall surface area of the exterior of said sidewall by between about 30% to about 165%.

12. The container of claim 8, wherein said protrusions increase the overall surface area of the exterior of said sidewall by between about 6% to about 100%.

13. The container of claim 8, wherein said void spaces are non-hermetic.

* * * * *